United States Patent
Cheng et al.

(10) Patent No.: US 12,326,824 B2
(45) Date of Patent: Jun. 10, 2025

(54) APPARATUS AND METHODS FOR GENERATING MESSAGE SIGNALED INTERRUPTS ASSOCIATED WITH PERIPHERAL COMPONENTS

(71) Applicant: ADVANCED MICRO DEVICES, INC., Santa Clara, CA (US)

(72) Inventors: Lianji Cheng, Suzhou (CN); Xiao Han, Suzhou (CN); Qing Li, Suzhou (CN)

(73) Assignee: ADVANCED DEVICES, INC., Santa Clara, CA (US)

( * ) Notice: Subject to any disclaimer, the term of this patent is extended or adjusted under 35 U.S.C. 154(b) by 79 days.

(21) Appl. No.: 18/191,207

(22) Filed: Mar. 28, 2023

(65) Prior Publication Data

US 2024/0330214 A1 Oct. 3, 2024

(51) Int. Cl.
*G06F 13/24* (2006.01)

(52) U.S. Cl.
CPC .................................. *G06F 13/24* (2013.01)

(58) Field of Classification Search
None
See application file for complete search history.

(56) References Cited

U.S. PATENT DOCUMENTS

| | | | | |
|---|---|---|---|---|
| 7,673,116 | B2* | 3/2010 | Hummel | G06F 12/1081 |
| | | | | 711/206 |
| 8,612,659 | B1* | 12/2013 | Serebrin | G06F 13/24 |
| | | | | 718/1 |
| 9,047,208 | B1* | 6/2015 | Moore | G06F 9/45533 |
| 10,628,350 | B1* | 4/2020 | Konda | G06F 13/24 |
| 2007/0005858 | A1* | 1/2007 | Shah | G06F 13/24 |
| | | | | 710/200 |
| 2013/0159581 | A1* | 6/2013 | Kegel | G06F 13/24 |
| | | | | 710/267 |
| 2018/0321985 | A1* | 11/2018 | Kakaiya | G06F 15/76 |

* cited by examiner

Primary Examiner — Michael Sun

(57) ABSTRACT

An apparatus includes logic circuitry, such as an interrupt controller, that serially arbitrates among a plurality of incoming interrupt requests for a target device and produces a selected incoming interrupt request. The logic generates a message signaled interrupt (MSI) message for the target device based on the selected incoming interrupt request using a plurality of linked lookup tables, such as a hierarchy of LUTs that include data used to generate the MSI message. Associated methods are also presented.

20 Claims, 11 Drawing Sheets

| MSI Control bits | MSI X Control bits | |
|---|---|---|
| 0 | Dev0Func0 | ← 342a |
| 1 | Dev0Func1 | |
| | ... | |
| 30 | Dev3Func6 | |
| 31 | Dev3Func7 | |
| 32 | DevxFuncxVF0 | |
| | DevxFuncxVF1 | |
| | ... | |
| | DevxFuncxVFn | |

FIG. 6

|   | 602 | 602 | 600 |
|---|---|---|---|
|   | Msg addr | Msg upper addr | Msg data |
| 0 | DevOFunc0 | | | ← 342b
| 1 | DevOFunc1 | | |
|   | ... | | |
|   | Dev3Func6 | | | ← 364a
| 30 | Dev3Func7 | | |
| 31 | DevxFuncxVF0 | | |
| 32 | DevxFuncxVF1 | | | } 364c
|   | ... | | |
|   | DevxFuncxVFn | | |

|   | 700 |   |
|---|---|---|
|   |   | 32 |
| 342a → 0 | DEV0Func0 | MSI MASK bits |
| 1 | DEV0Func1 | MSI MASK bits |
| ... | ... | ... |
| 31 | DEV3Func7 | MSI MASK bits |
| 32 | VF0 | MSI MASK bits |
| 33 | VF1 | MSI MASK bits |
| ... | ... | ... |

FIG. 8

| | 342a | 800 32 | 368a |
|---|---|---|---|
| 0 | DEV0Func0 | MSI Pending bits | |
| 1 | DEV0Func1 | MSI Pending bits | |
| | ... | ... | |
| 31 | DEV3Func7 | MSI Pending bits | |
| 32 | VF0 | MSI Pending bits | |
| | VF1 | MSI Pending bits | |
| | ... | ... | |

FIG. 9

|   | 342a | 900 |
|---|---|---|
| 0 | DEV0Func0 | Entry_OFT0 |
| 1 | DEV0Func1 | Entry_OFT1 |
| ... | ... | ... |
| 31 | DEV3Func7 | Entry_OFT31 |
| 32 | VF0 | Entry_OFT32 |
| 33 | VF1 | Entry_OFT33 |

Rows 0–31 are bracketed as 370a; rows 32–33 are bracketed as 370b.

| | Msg addr (1000) | Msg upper addr (1000) | Msg data (1002) |
|---|---|---|---|
| Dev0Func0 | ENTRY0 | | |
| | ... | | |
| | ENTRY{n} | | |
| Dev0Func1 | ENTRY0 | | |
| . | ... | | |
| . | ENTRY{m} | | |
| . | ... | | |
| Dev3Func7 | ENTRY0 | | |
| | ... | | |
| | ENTRY{l} | | |
| VF0 | ENTRY0 | | |
| | ... | | |
| | ENTRY{p} | | |
| | ... | | |

364b (upper portion), 364d (VF0 portion)

FIG. 11

APPARATUS AND METHODS FOR GENERATING MESSAGE SIGNALED INTERRUPTS ASSOCIATED WITH PERIPHERAL COMPONENTS

BACKGROUND OF THE DISCLOSURE

Computing systems, such as cloud servers, machine learning systems or other computing systems employ host processors, such as processors executing instances of a Hypervisor, operating systems (OS) and/or applications and connect to peripheral devices, such as discrete graphics processors, hard disk drives, smart data acceleration interfaces (SDXI) engines, universal serial bus (USB) devices, network interface cards and other peripheral clients through an expansion bus such as a peripheral component interconnect bus. The peripheral devices are also configured to operate as physical functions (PF) and virtual functions (VF) as part of virtual machine (VM) operation. For example, a virtual function can be a lightweight peripheral component interconnect express (PCIe) function that shares one or more physical resources with the physical function and with virtual functions that are associated with that physical function.

The peripheral component interconnect express (PCIe) bus is one example of a peripheral component interconnect bus and is based on point-to-point topology, with separate serial links connecting devices to the root complex (host). Interface logic (also referred to as Northbridge Interface (NBIF) logic) is used between the root complex and the PCIE infrastructure for different peripheral input/output (I/O) clients and data path hubs. The interface logic typically provides error reports, timeout detection and interrupt messaging (INT/MSG) related to the transactions.

As part of interrupt messaging, Message Signaled Interrupts (MSI) is a feature that enables a device function to request interrupt service by writing a system-specified data value to a system-specified address (using a DWORD Memory Write transaction). System software initializes the message address and message data (also referred to as interrupt vector) during device configuration, allocating one or more vectors to each MSI-capable function. MSI-X defines a separate optional extension to basic MSI functionality.

When a device function (PF or VF) or other PCIe infrastructure component wants to interrupt the host, such as a CPU, or other PCIe components a Message Signaled Interrupt (MSI) and/or MSI-X interrupt mechanism is used. Generally, an MSI is a write from a peripheral component device function to a special address which causes an interrupt to be generated and received by a host processor such as a central processing unit (CPU). MSI messaging permits for example a device to allocate 1, 2, 4, 8, 16 or 32 interrupts. The device is programmed with an address to write to (generally a control register in an interrupt controller), and a 16-bit data word to identify it. The interrupt number is added to the data word to identify the interrupt.

As to MSI-X messages, an MSI-X table structure contains multiple entries and each entry represents one interrupt vector. Each entry has 4 QWORDs and consists of a 32-bit lower message address, 32-bit upper message address, 32-bit data, and a single mask bit in the vector control field. When the device wants to transmit an MSI-X interrupt message, the device picks up an entry in the vector table structure, sends out a PCIe memory write with the address and data in the table to the system host.

Typically, an interrupt controller in the interface logic is responsible for collecting incoming interrupt request events from I/O client devices and sends out the interrupt messages (INTx, MSI and MSI-X) for the host processor or other components. As the number of I/O physical functions and virtual functions increases, managing the interrupt requests consumes excessive power and can undesirably increase the complexity and size of the interface logic and/or the interrupt controller.

BRIEF DESCRIPTION OF THE DRAWINGS

The implementations will be more readily understood in view of the following description when accompanied by the below figures, wherein like reference numerals represent like elements, and wherein:

FIG. 6 is a diagram illustrating one example of one of a plurality of MSI generation lookup tables in accordance with an example set forth in the disclosure;

FIG. 7 is a diagram illustrating one example of one of a plurality of MSI generation lookup tables in accordance with an example set forth in the disclosure;

FIG. 8 is a diagram illustrating one example of one of a plurality of MSI generation lookup tables in accordance with an example set forth in the disclosure;

FIG. 9 is a diagram illustrating one example of one of a plurality of MSI generation lookup tables in accordance with an example set forth in the disclosure;

FIG. 10 is a diagram illustrating one example of one of a plurality of MSI generation lookup tables in accordance with an example set forth in the disclosure;

FIG. 11 is a diagram illustrating one example of one of a plurality of MSI generation lookup tables in accordance with an example set forth in the disclosure;

Figure 1:
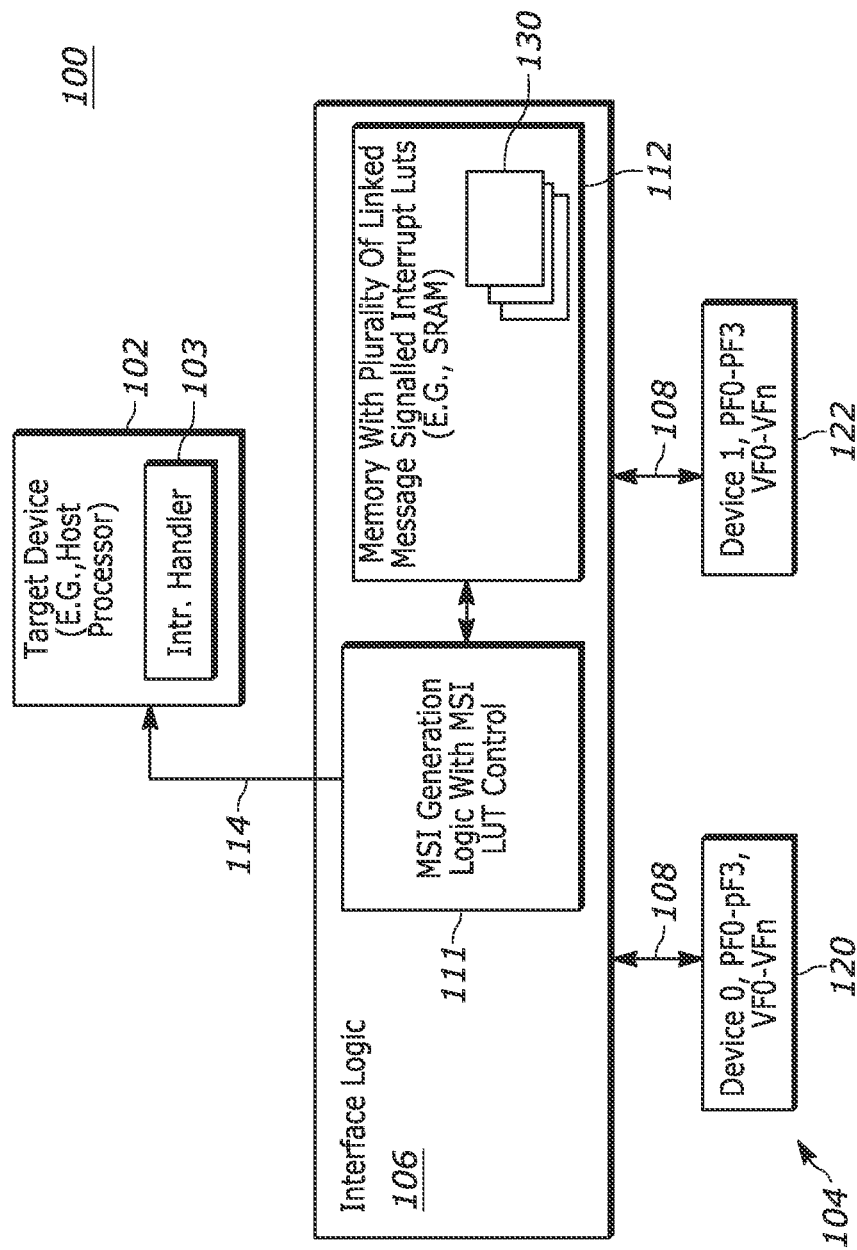
FIG. 1 illustrates a block diagram of computer processing system that generates MSI messages in accordance with an example set forth in the disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

Conventional flop-based mechanisms handle interrupt signals in a parallel way which duplicates hardware sources along and increases as the number of interrupt signals are being increased to hundreds or thousands. However, at each time there is only one interrupt message that is allowed to be transmitted to the host, because there is only one PCIe path for the interrupt message transmission. Legacy flop-based mechanisms store all PCIe end point (EP) functions' PCIe MSI and MSIX table contents into local registers, and especially for MSI-X interrupt requests, the size is increased with the increasing number of interrupt vectors (including PF and associated VFs), if the supported interrupt number and VF number is large, the number of registers and interconnections will also be very large. As to MSI-X messages, an MSI-X vector table contains multiple entries and each entry represents one interrupt vector. Each entry has 4 DWORDs and consists of a 32-bit lower Message Address, 32-bit upper Message Address, 32-bit data, and a single Mask bit in the Vector Control field. When the PCIE interrupt controller wants to transmit an MSI-X interrupt message, the interrupt controller picks up an entry in the table, sends out a PCIe memory write with the address and data in the table to the system host.

For example, an MSI-X vector table size for each function, if it has SRIOV support, will be:

$$\text{vec\_num} * 4DW * (1 + \text{vf\_num})$$

As an example where, vec_num=140, vf_num=64, so the total table size is 140*4*(1+64)=36400 DW.

Also, if there are hundreds or thousands of interrupt sideband signals and also it is required to support SR-IOV with dozens of virtual functions (VFs), die hardware area is consumed by these registers and wire interconnects are increased. Facing the challenge of higher and higher clock frequency along with the manufacturing process moving to be 5 nanometers or even smaller, the legacy flop-based parallel method is undesirable.

To improve over conventional systems, an improved MSI generation mechanism is employed that uses MSI table and/or MSI-X table information for multiple interrupt sources that is stored in a plurality of linked lookup tables. For example, the MSI-X data in vector table structures across multiple I/O clients is split up and organized into a hierarchy of multiple lookup tables (LUTs) in memory. The multiple LUTs are linked in that there is a hierarchical search carried out by the interrupt controller among the plurality of LUTs to generate an MSI and/or MSI-X message.

In some implementations an arbiter is added before interrupt requests are processed by an interrupt controller (also referred to as an MSI interrupt generator) to provide a serialized approach to handling interrupt requests that are received from interrupt sources, such as requesting (source) I/O client devices. The arbiter in some implementations includes several small arbiters, for example, 16 to 1 or 32 to 1 serial arbiters. In some implementations the arbiter serially arbitrates among incoming I/O client interrupt requests from a plurality of I/O clients and produces a selected interrupt request from the incoming interrupt requests. In some implementations, the interrupt controller uses the selected interrupt request as an index to lookup an entry in an interrupt description LUT. The contents of the interrupt description LUT looked up entry are used to search multiple other LUTs that include other related MSI generation data. Each of the multiple LUTs include MSI generation data for multiple (in some implementations for all) of the plurality of requesting I/O devices in the system. The interrupt controller generates different types of MSI messages for a target device, such as an MSI message or an MSI-X message depending on which interrupt request is selected.

In some implementations, an apparatus comprises interface logic, such as an interrupt controller in a PCIE interface, that generates a message signaled interrupt (MSI) message for the target device based on an incoming interrupt request, using a plurality of linked lookup tables, such as a hierarchy of LUTs that include data used to generate an MSI message. In some implementations, the interface logic serially arbitrates among a plurality of incoming interrupt requests for a target device and produces a selected incoming interrupt request that is used to access the plurality of linked lookup tables.

In certain implementations, memory stores the plurality of linked lookup tables. In some implementations, a processor executing a driver and/or firmware generates the plurality of linked lookup tables by storing at least message interrupt linking data, that is part of an entry in an interrupt description lookup table, in each of the plurality of linked lookup tables.

In some implementations, each of the plurality of incoming interrupt requests includes a unique index number. The logic uses the unique index number associated with the selected incoming interrupt request to fetch corresponding interrupt identification data for the selected incoming interrupt request from the interrupt description lookup table. The logic uses the fetched interrupt identification data to fetch MSI control information from a first level control lookup table. In certain implementations, the MSI control information indicates at least a type of MSI message to generate for the selected incoming interrupt request. Based on a type of MSI message identified, the logic accesses at least a second level LUT that includes associated MSI data and address information corresponding to the selected incoming interrupt request. The logic generates the MSI message (e.g., a write request) based on the associated MSI data and address information.

In certain implementations, the interface logic comprises an arbiter serially arbitrates among the plurality of incoming interrupt requests and includes a plurality of inputs that receive the plurality of incoming interrupt requests for a target device from the plurality of peripheral component requesting client devices and serially processes them, such as in a round robin fashion or other suitable operation. The arbiter includes an output and the selected incoming interrupt request is produced for use with the interrupt description lookup table. In some implementations, each of a plurality of entries in the interrupt description lookup table comprises interrupt identification data representing at least: a source client device type, a device identifier, a physical function identifier, a virtual function identifier, and a vector index.

In some implementations, the logic generates the plurality of lookup tables in memory by remapping message signaled interrupt table information corresponding to each requesting client device into a plurality of lookup tables. In some implementations each entry of a message signaled interrupt PCIe table corresponds to an interrupt vector and the logic remaps interrupt vector information from a corresponding interrupt vector in the table among the plurality of LUTs.

In certain implementations, the logic remaps MSI capability table information, such as information in PCIe MSI and MSIx tables, in response to an operating system capability request, to the plurality of linked lookup tables. For example, the logic remaps MSI and MSI-X table information from an operating system capability request, to the differing addressable lookup tables so that they each contain MSI (including MSIX) generation data for a plurality of requesting I/O clients.

In certain implementations, the message interrupt linking data that links the plurality of linked lookup tables is comprised of the device identifier and at least the physical function identifier. The logic generates the MSI message based on data fetched from the plurality of LUTs using the device identifier and the physical function identifier.

In some implementations, the logic includes a first in first out (FIFO) buffer for each of the plurality of peripheral component requesting client devices. Each FIFO buffer is configured to receive incoming interrupt requests and output an incoming interrupt request to the arbiter.

In certain implementations, a computer processing system comprises a host processor; a plurality of peripheral component I/O requesting client devices; peripheral component interconnect interface logic, that is coupled to the host processor and to the plurality of peripheral component requesting client devices. The peripheral component interconnect interface logic comprises memory that stores a plurality of linked lookup tables comprising data for generating a message signaled interrupt (MSI) message. The peripheral component interconnect interface logic serially arbitrates among a plurality of incoming interrupt requests from the plurality of peripheral component requesting client devices, including physical and virtual functions, for the host processor and produces a selected incoming interrupt request. The peripheral component interconnect interface logic generates the message signaled interrupt (MSI) message for the host processor based on the selected incoming interrupt request using the plurality of linked lookup tables.

In some implementations, the memory stores an interrupt description lookup table and the logic generates the plurality of linked lookup tables by storing message interrupt linking data, in each of the plurality of linked lookup tables that is part of an entry in the interrupt description lookup table.

In some implementations, each of the plurality of incoming interrupt requests includes a unique index number and the peripheral component interconnect interface logic uses the unique index number associated with the selected incoming interrupt request, as an address to fetch corresponding interrupt identification data for the selected incoming interrupt request from an interrupt description lookup table. The peripheral component interconnect interface logic uses the fetched interrupt identification data to fetch MSI control information from a first level control lookup table, wherein the MSI control information indicates at least a type of MSI message to generate for the selected incoming interrupt request. Based on a type of MSI message identified, the peripheral component interconnect interface logic accesses at least a second level LUT that comprises associated MSI data and address information corresponding to the selected incoming interrupt request and generates the MSI message (MSI or MSI-X) based on the associated MSI data and address information.

In certain implementations, the peripheral component interconnect interface logic comprises an arbiter that receives the plurality of incoming interrupt requests for the host processor from the plurality of peripheral component requesting client devices and each of a plurality of entries in the interrupt description lookup table comprises data representing at least: a source client device type, a device identifier, a physical function identifier, a virtual function identifier, and a vector index.

In some implementations, the logic generates the plurality of lookup tables in memory by remapping message signaled interrupt table information corresponding to each requesting client device such that a lookup table in the plurality of look up tables comprises message and address data for multiple different client devices in a same lookup table.

In certain implementations, a method for generating a message signaled interrupt (MSI) comprises serially arbitrating among a plurality of incoming interrupt requests, such as from a plurality of source peripheral component requesting client devices, and producing a selected incoming interrupt request; and generating a message signaled interrupt (MSI) message for a target device, such as a processor or other PCIE device function, based on the selected incoming interrupt request using a plurality of linked lookup tables. The plurality of linked lookup tables are indexed to interrupt requests that are generated by the requesting clients.

In some implementations, the method includes generating the plurality of linked lookup tables by storing message interrupt linking data in each of the plurality of linked lookup tables that is part of an entry in an interrupt description lookup table; and storing the plurality of linked lookup tables in memory.

In some implementations, each of the plurality of incoming interrupt requests includes a unique index number and the method includes: using the unique index number associated with the selected incoming interrupt request to fetch corresponding interrupt identification data for the selected incoming interrupt request from an interrupt description lookup table; using the fetched interrupt identification data to fetch MSI control information from a first level control lookup table, wherein the MSI control information indicates at least a type of MSI message to generate for the selected incoming interrupt request; based on a type of MSI message identified, accessing at least a second level LUT that comprises associated MSI data and address information corresponding to the selected incoming interrupt request; and generating the MSI message based on the associated MSI data and address information.

In certain implementations, the method includes using a unique index number associated with the selected incoming interrupt request as an address to fetch corresponding interrupt identification data for the selected incoming interrupt request from an interrupt description lookup table. In some implementations, each of a plurality of entries in the interrupt description lookup table comprises interrupt identification data representing at least: a source client device type, a device identifier, a physical function identifier, a virtual function identifier, and a vector index.

In certain implementations, the message interrupt linking data that links the plurality of linked lookup tables is comprised of the device identifier and at least the physical function identifier, and the method includes generating the MSI message based on data fetched from the plurality of LUTs using the device identifier and the physical function identifier.

FIG. 1 is a block diagram illustrating one embodiment of a computer processing system 100, such as a system on chip, data center server, laptop, mobile phone, internet appliance, or other suitable device. One or more target devices 102, such as a host processor, are configured to execute instructions stored in system memory and in some examples, a target device includes a central processing unit (CPU), graphics processing unit (GPU), accelerated processing units (APUs), machine learning unit, artificial intelligence unit or other suitable processing devices. Each of the target devices include, in some examples, a plurality of processing cores. One or more requesting devices, such as I/O requesting client devices 104, issue interrupt requests 108 that request the target device 102 to perform an interrupt operation using for example an interrupt handler 103 in the target device. Interface logic 106 serves as an interface circuit block that manages outstanding transactions between requesting devices and target devices and also generates MSI messages 114 based on the incoming interrupt requests 108 received from a requesting client device 104. As shown in this example, the interface logic 106 includes MSI generation logic 111 and memory 112, such as SRAM or other suitable addressable memory, that stores a plurality of linked lookup tables (LUTs) 130 that are indexed to the requesting client device 120 and 122 and used to generate message signaled interrupt messages 114 based on interrupt requests 108 to the target device 102.

The interface logic 106 receives incoming interrupt requests 108 for the target device 102 from the requesting client devices 104 and generates a corresponding message signaled interrupt (MSI) message 114 for the target device 102 using the plurality of linked lookup tables (LUTs) 130 based on the contents of an incoming interrupt request 108. In some implementations, the plurality of linked LUTs 130 are linked in a hierarchical manner and an identifier in the incoming interrupt request 108 is used as an address in a first level lookup table, also referred to as an interrupt description lookup table. The first level lookup table includes linking data that links to other of the linked LUTs depending on linking data stored in the first level look up table for the corresponding address. The linked lookup tables (LUTs) 130 are programmable and are programmed by the interface logic on power up, or after power up based on requesting device configurations or using one or more control registers or in any other suitable manner.

Figure 2:
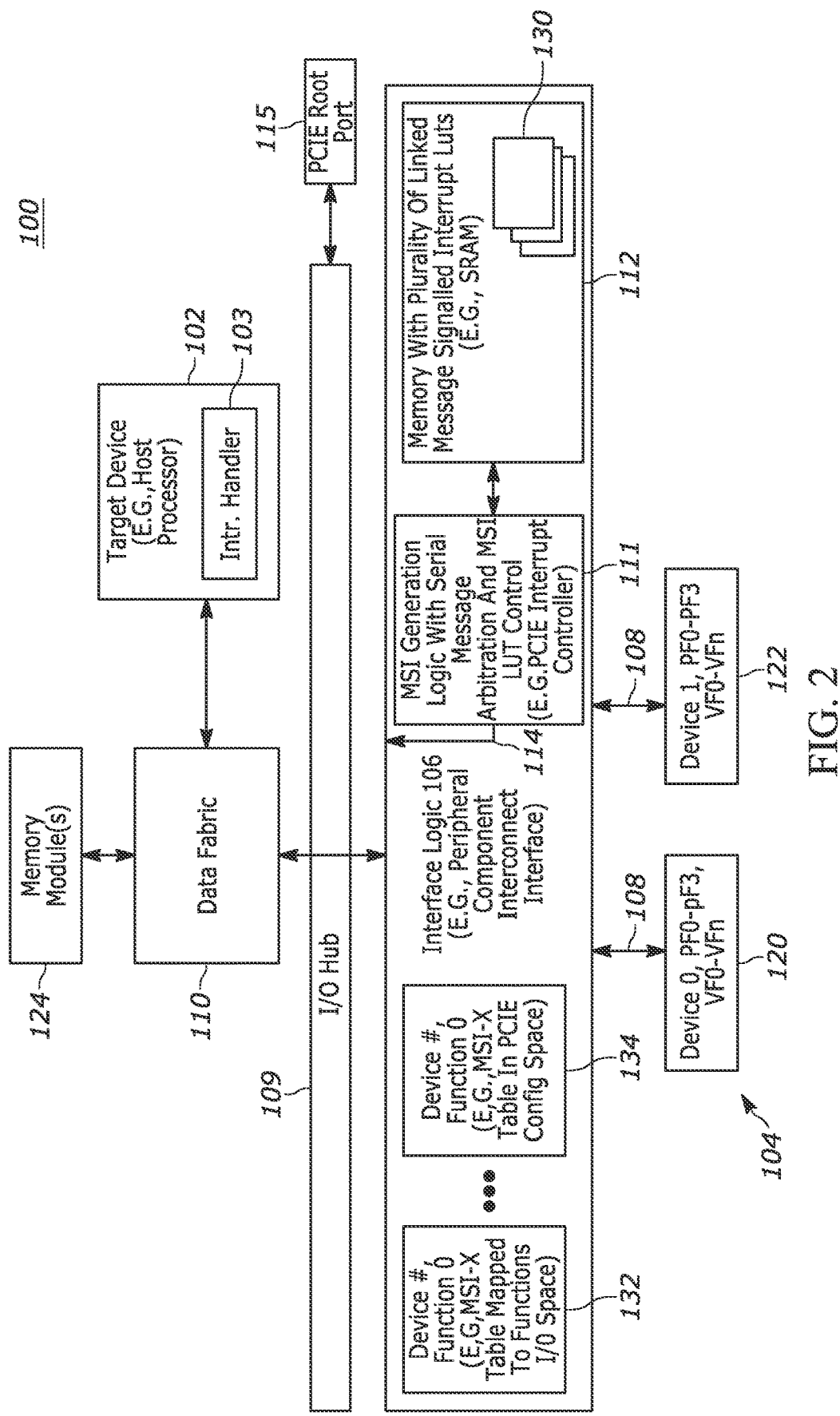
FIG. 2 illustrates a block diagram of computer processing system that generates MSI messages in accordance with another example set forth in the disclosure.

FIG. 2 is a block diagram illustrating one embodiment of the computer processing system 100. In this example, interface logic 106 is peripheral component interconnect interface logic that supports multiple devices which includes multiple device functions and uses the configuration space for all devices and functions. However, where each device has a PCIe MSI and MSI-X table for each function, during a device configuration process by the OS, the interface logic 106 employs an address decoder to remap information from MSI and MSI-tables being sent by each OS to a during a capability request, to appropriate lookup tables so that during a later interrupt request by a device function, the lookup tables are used to generate an MSI or MSIX interrupt to the host processor. As such, MSI and MSIX table information for all devices are stored in a plurality of LUTs during a configuration process. Each peripheral device in this example includes multiple root ports and includes multiple physical functions (PF) and virtual functions (VF), however any suitable peripheral devices can be used. In some examples, the interface logic 106 detects in-band interrupt messages from root complex ports, PCIe switches, end points (EP) and associated functions and operations internal to the interface logic. However, any suitable component that are configured for MSI messaging may be employed.

From an upstream communication direction, interface logic 106 receives an incoming interrupt request 108 from the requesting client devices 104 that includes a unique interrupt request identifier. The interface logic 106 transforms each of the incoming interrupt requests into a corresponding MSI message 114 depending on a capability of a requesting client device. The generated MSI message 114 is a write command to a system memory address assigned by the OS for an MSI message for the corresponding device that requested the interrupt. The MSI message 114 causes the target device 102 to perform interrupt handling of the issued MSI message. In this example, PCIe MSI messages are converted to HyperTransport (HT) interrupt messages in an I/O hub 109.

The computer processing system 100 will be described as a data center server system, for illustration purposes only, and it will be recognized that any suitable configuration may be employed. In this example, the target device 102 includes a host target processor such as multi-core central processing unit, multi-core GPU, multi-core APU or any suitable processor that performs transactions requested by peripheral device requesting devices 104. In this example, in an upstream flow, the I/O hub 109 gathers generated MSI messages 114 from the interface logic 106 that come from the requesting client devices 120 and 122, such as I/O devices, and forwards the MSI messages 114 to the target device 102 through a data fabric 110. The I/O hub 109 connects to other PCIE root ports 115 if desired. It will be recognized that the I/O hub 109 and data fabric 110 need not be employed depending upon the design of the system. In this example the interface logic 106 is an I/O peripheral component interface that is compliant with PCIe requirements, however any suitable interface device may be employed. If desired, memory modules 124 are coupled to the data fabric to provide the requesting client devices and target device with additional memory.

In some examples, the client requesting devices 104 include discrete graphics processing units, USB devices, network interconnect device or other devices including identified virtual machines of the devices, identified functions (virtual and/or physical functions) of the devices that are connected to the host target through the peripheral component interface logic 106. A requesting device includes for example I/O devices, I/O device functions, functions internal to the interface logic or any suitable component that issues interrupt requests that the interface logic 106 uses to generate MSI messages for the target device 102.

In some implementations, the interface logic 106 reports a requesting client device 104 as a PCIE device to the host and performs PCIE root checks and also provides error reports, timeout detections and MSI message (INT/MSG) generation for client devices. As shown in this example, the interface logic 106 includes MSI generation logic 111 and memory 112, such as SRAM or other suitable addressable memory, that stores a plurality of linked lookup tables (LUTs) 130 that are indexed to the requesting client device 120 and 122 and used to generate message signaled interrupt messages 114 based on interrupt requests 108 to the target device 102. In this example, the MSI generation logic 111 includes serial arbitration and MSI lookup table control. In this example, the MSI generation logic 111 is implemented a PCIE interrupt controller. The interface logic 106 has access to the PCIE configuration space for each device (including device functions) as shown by blocks 132 and 134. The MSI message generation logic 111 may be located in end points, root complexes, or other locations and can be employed for any suitable device functions including those internal to the interface logic or any suitable interrupt requesting device that utilizes MSI messaging. The interface logic 106 and MSI generation logic 111 are implemented as electronic circuitry and in some implementations includes state machines, digital combinational logic, memory, programmable gate arrays, programmable controllers or any suitable logic. Also, in this example, the plurality of linked lookup tables 130 are each stored as a separate addressable SRAM structure however, it will be recognized that other structures may be employed and the lookup tables may be combined into a single table or split into other desired formats.

Figure 3:
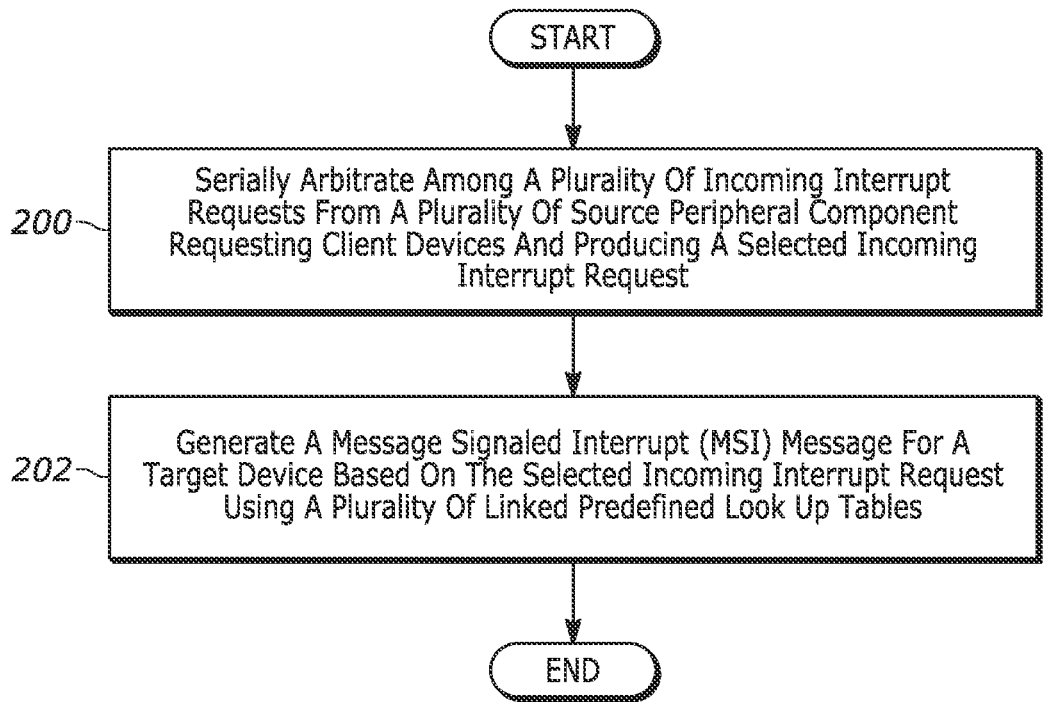
FIG. 3 is a flowchart illustrating a method for generating MSI messages in accordance with an example set forth in the disclosure.

Referring also to FIG. 3, a method for generating message signaled interrupts is shown and will be described with reference to FIG. 2. It will be recognized however that any suitable structure may be used. It will also be recognized that the operations for the processes described herein may be performed in any suitable order. The method is applicable to any suitable MSI message generation logic. As shown in block 200, the method includes serially arbitrating among a plurality of incoming interrupt requests and producing a selected incoming interrupt request. For example, MSI generation logic 111 receives interrupt requests 108 from the plurality of source peripheral component requesting client devices 104 for the target device 102 such as a host processer and serially arbitrates among them and selects one of the interrupt requests for processing. As shown in block 202, the method includes generating the message signaled interrupt (MSI) message 114 for the target device 102 based on the selected incoming interrupt request using the plurality of linked lookup tables 130.

Figure 4:
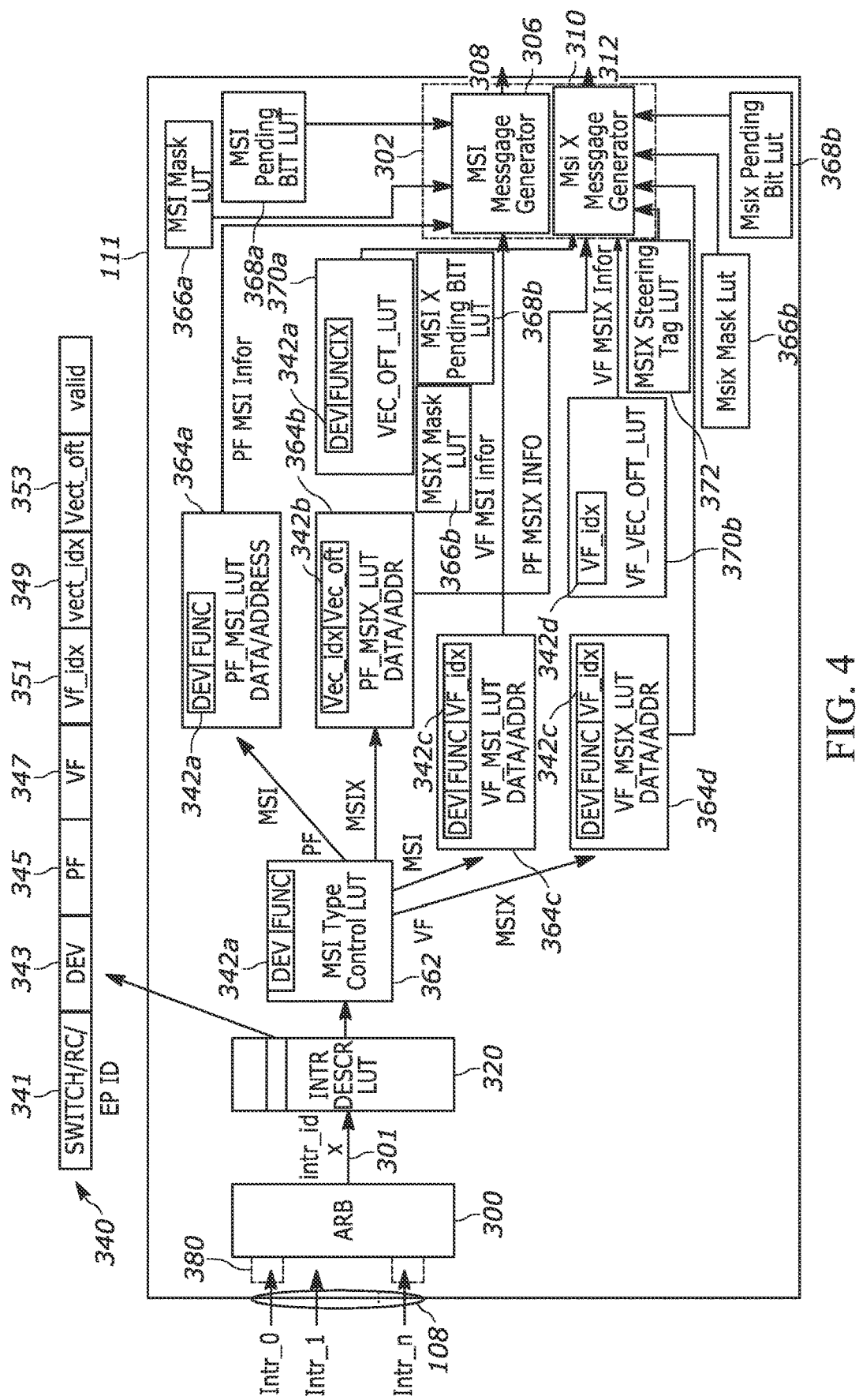
FIG. 4 illustrates a block diagram of an apparatus that generates MSI messages in accordance with an example set forth in the disclosure.

Referring to FIG. 4, a block diagram illustrates an example of the MSI generation logic 111 and its use of the plurality of linked LUTs 130. For this example, it will be assumed that requesting client devices 104 have different capabilities as to issuing different types of MSI interrupt requests that result in MSI messages and/or MSI-X messages in compliance with PCIE operation. However, it will be recognized that any suitable message signaled interrupt message format may be employed. The MSI generation logic 111 includes an arbiter 300 and MSI control logic 302. The MSI control logic 302 fetches data from the plurality of linked LUTs 130 and includes MSI message generator logic 306 that generates (e.g., issues) MSI type messages 308 (writes) and MSI-X message generator 310 that generates MSI-X type messages 312 (writes) as the generated MSI messages 114. It will be recognized that the function described may be combined or split in any suitable manner. In some implementations, each client device is mapped to a PCIe end point function, and a FIFO buffer 380 is provided for each client device to store incoming interrupt requests that are then provided to the arbiter. Where a client device supports single root I/O virtualization (SR-IOV), in some implementations, a FIFO is provided for each VF interrupt source.

The interface logic 106 generates certain of the plurality of linked lookup tables 130 in memory by remapping message signaled interrupt table information corresponding to each requesting client device into a plurality of lookup tables. In some implementations each entry of a message signaled interrupt PCIe table corresponds to an interrupt vector and the interface logic splits interrupt vector information from the table among the plurality of LUTs. For example, Table I below is a general example of MSI capability table information respectively, set out in PCIe specification 5.0, version 1.0, that is provided by the I/O devices during a capability request process from the OS. The interface logic generates the plurality of lookup tables in memory by remapping message signaled interrupt table information corresponding to each requesting client device such that a lookup table in the plurality of linked look up tables includes table data for multiple different client devices in a same lookup table. Data in the table is remapped by the control logic to the plurality of linked lookup tables 130 as shown in FIGS. 4-13. Table I illustrates an PCIe MSI table structure with an interrupt vector in each entry, such as a message control vector, a message address vector, a message data vector, a mask bits vector and a pending bits vector. By way of example, the control message vector is remapped to an entry in the message type control LUT 362. The message address vector and message data vectors are remapped to the data/address LUT 364a and data/address LUT 364c depending on a device PF and VF. The mask bits vector is remapped to the MSI mask LUT 366a and the pending bits vector is remapped to the MSI pending a bit LUT, such as a fourth level LUT 368a. Other table data can also be remapped as desired. Similar remapping is done for MSI-X table information during the capability request process.

TABLE I

| 31 30 29 28 27 26 25 24 23 22 21 20 19 18 17 16 15 14 13 12 11 10 9 8 | 7 6 5 4 3 2 1 0 | Byte Offset |
|---|---|---|
| Message Control | Next Capability Polster | Capability ID | +000h |
| Message Address | | +004h |
| Extended Message Data (or RsvdP) | Message Data | +008h |
| Mask Bits | | +00Ch |
| Pending Bits | | +010h |

As such, in certain implementations, the interface logic 106 such as through a driver, remaps MSI capability table information, such as the information in PCIe MSI Table I, in response to an operating system capability request, to the plurality of linked lookup tables 130. For example, the interface logic 106 remaps MSI and MSI-X table information from an operating system capability request to the differing addressable lookup tables so that they each contain MSI (including MSIX) generation data for a plurality of requesting I/O clients.

In this example, one of the plurality of linked LUTs that is set up under control of executing firmware, includes an interrupt description (IDL) lookup table 320 that includes an entry corresponding to each of the requesting client devices 120 and 122 and their respective functions that request interrupts. For example, each requesting client, such as each PF and VF is assigned a unique index number, such as an address that maps into the interrupt description lookup table 320, so that each incoming request is used to lookup a corresponding entry in the interrupt description lookup table 320. In some implementations, different sets of LUTs are used depending upon a device type. In this example, the interrupt description LUT 320 contains data for all I/O devices that have been configured by firmware of the interface logic as part of an initialization operation.

The arbiter 300 includes a plurality of inputs configured to receive the plurality of incoming interrupt requests 108 for the target device 102 or other device, from the plurality of peripheral component requesting client devices 120 and 122. The arbiter 300 serially arbitrates among the incoming interrupt requests 108 in a round robin fashion and produces a selected incoming interrupt request 301 via an output of the arbiter and whose value is an address to an entry in the interrupt description lookup table 320. The contents of the entry, also referred to as interrupt identification data 340 is used to identify which of the plurality of linked LUTs 130 to use (e.g., MSI vs MSI-X) and parts of the entry are used to lookup information in the identified plurality of linked LUTS for use in generating an MSI message (MSI and/or MSI-X). For example, certain fields of each entry in the IDL LUT 320 are used as message interrupt linking data 342a-342n that is stored in certain of the linked lookup tables. The message interrupt linking data 342a-342n is used to search the hierarchy of multiple LUTS. The message interrupt linking data 342a-342n links the plurality of linked lookup tables and includes in some implementations, the device identifier 343 and at least the physical function identifier 345. The MSI generation logic 111 generates the MSI message 114, such as an MSI message 308 or an MSI-X message 312, based on data fetched from the certain of linked LUTs using the device identifier 343 and at least the physical function identifier 345. For example, LUTs 362, 364a, 364c. 364d and other LUTS are searched by at least device identifier 343 and the physical function identifier 345.

In this example, the interrupt identification data 340 is stored in fields of an entry in IDL 320 and includes one or more of data representing a source client device type 341, a device identifier 343, a physical function identifier 345, a virtual function identifier 347, a vector index 349 a virtual function index 351, and a vector offset 353. Certain fields are not populated if the originating client device does not have the capability for a particular function. For example, if a device has not been configured with the MSI-X capability, no vector offset or virtual function index data will be present in the entry. Also if used, each FIFO buffer 380 is configured to receive incoming interrupt requests and output an incoming interrupt request to the arbiter 300. In this way interrupt requests can be queued if needed.

Referring also to FIGS. 5-14, in this example, the plurality of linked lookup tables are configured in a hierarchy. A first level LUT in the plurality of linked LUTs 130 is first level MSI type control LUT 362 that includes MSI control information 500 and 502 pulled from the table information in Table I above during the OS capability request process. The MSI control information 500 and 502, indicates a type of MSI message to generate, such as whether to generate an MSI or an MSI-X message, for the selected interrupt request 301. Based on a type of MSI message to generate, second level LUTs, such as data/address LUTs 364a-364d, are used that include write address and data information for a PF or VF client. For example, if the selected interrupt request 301 is determined to be for a PF for an MSI interrupt request, the MSI data/address LUT 364a is accessed. If the selected interrupt request 301 is determined to be for a VF for an MSI interrupt request, the VF MSI data/address LUT 364c is accessed. If the selected interrupt request 301 is determined to be for a PF for an MSI-X interrupt request, the MSI-X data/address LUT 364b is accessed. If the selected interrupt request 301 is determined to be for a VF for an MSI-X interrupt capable client, the VF MSI-X data/address LUT 364d is accessed.

Third level LUTs 366a and 366b include mask bits for the MSI message. Fourth level LUTs 368a and 368b include pending bit information for the MSI message, fifth level LUTs 370a and 370b include data regarding vector offset information for MSI-X messages, and a sixth level LUT 372 includes steering tag data in case steering tags are stored in the MSI-X table in the PCIE configuration space. It will be recognized that the search order of the hierarchy of LUTs may be done in any suitable order, that different levels of LUT hierarchy for the MSI message generation may be used and that the table information may be combined or separated as desired. For example, MSI information for both PF and VFs, in some implementations are in the same LUT as shown in FIGS. 7-14.

Figure 5:
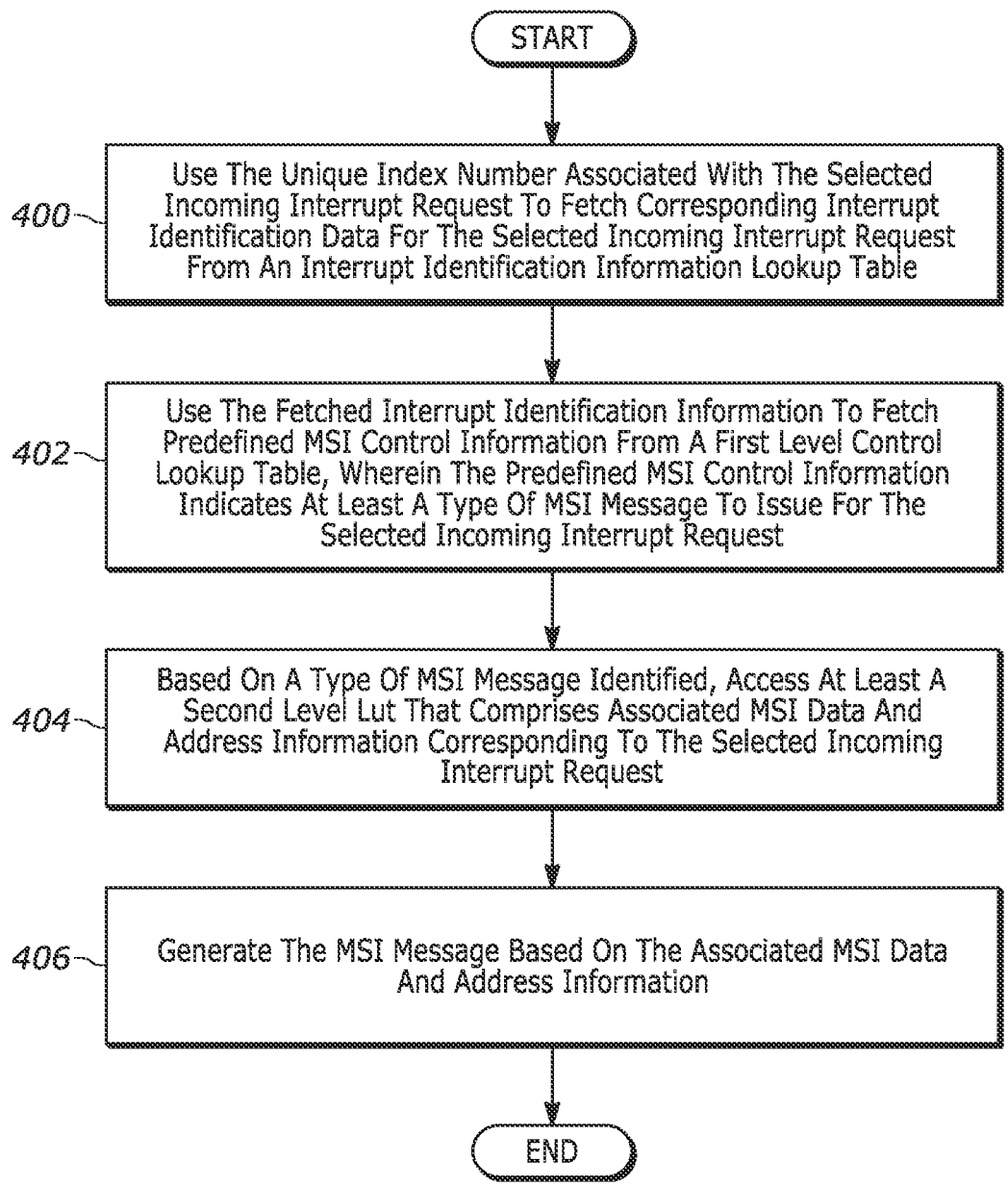
FIG. 5 is a flowchart illustrating a method for generating MSI messages in accordance with an example set forth in the disclosure.
Figures 12, 13:
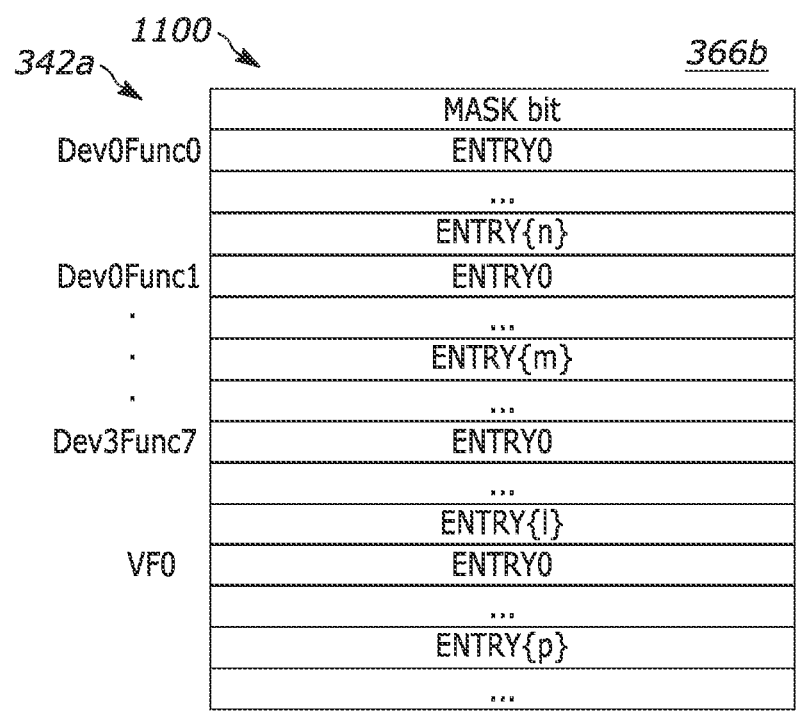
FIG. 12 is a diagram illustrating one example of one of a plurality of MSI generation lookup tables in accordance with an example set forth in the disclosure.
FIG. 13 is a diagram illustrating one example of one of a plurality of MSI generation lookup tables in accordance with an example set forth in the disclosure.
Figure 14:
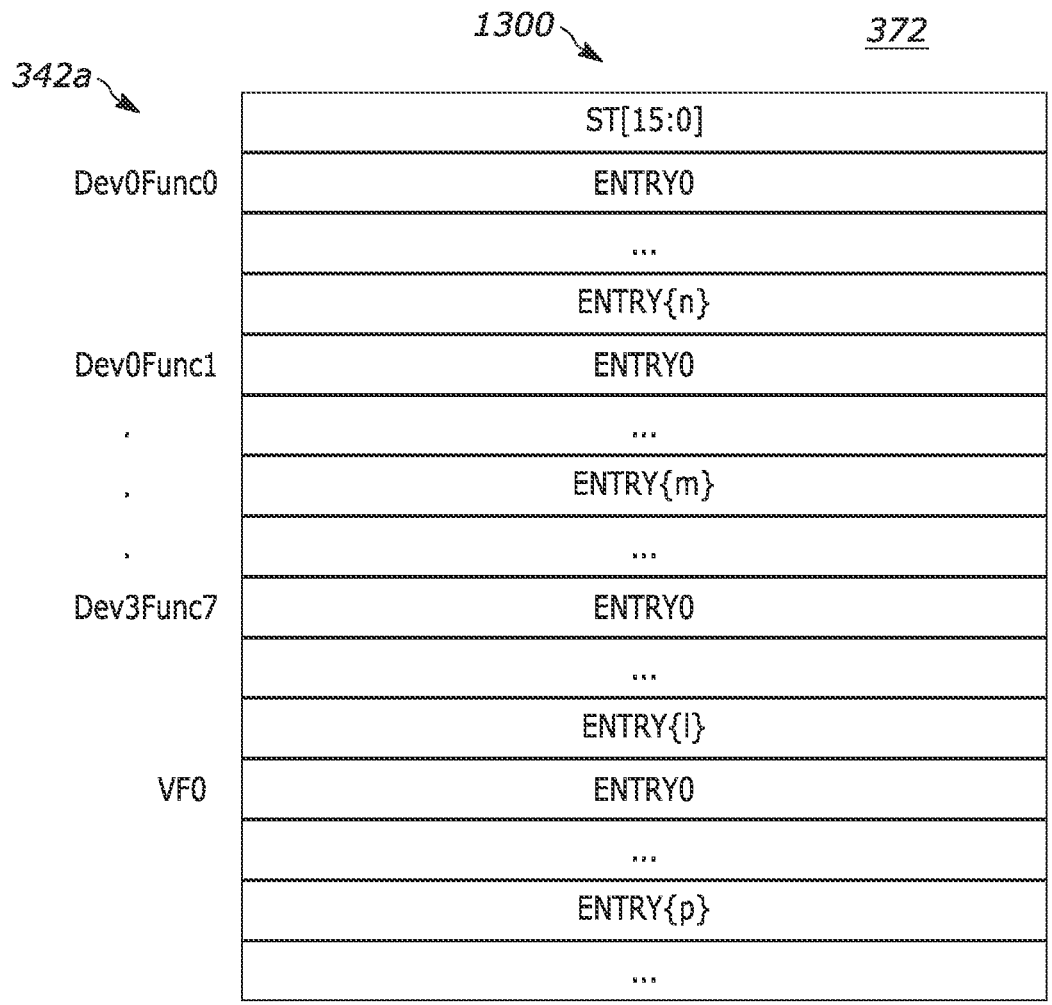
FIG. 14 is a diagram illustrating one example of one of a plurality of MSI generation lookup tables in accordance with an example set forth in the disclosure.

Referring also to FIG. 5, in operation, as shown in block 400, in one example, the MSI message control logic 302 uses the unique index number associated with the selected incoming interrupt request as an address to fetch corresponding interrupt identification data 340 for the selected incoming interrupt request 301 from the interrupt description lookup table 320. As shown in block 402, the method includes using the fetched interrupt identification data 340 to fetch MSI control information 500 or 502 from the first level control lookup table 362. In one example, the interrupt description lookup table 320 includes a corresponding entry for every registered PCIE device and device function including an entry for each device and corresponding interrupt vectors since some devices support multiple interrupt vectors. The MSI control information 500 and 502 (FIG. 6) indicates a type of MSI message to generate for the selected incoming interrupt request 301. In one example, the MSI message control logic 302 uses the MSI control information 500 (i.e., control bits) or the MSI-X control information 502 (control bits) to determine a type of MSI message to send such as whether to generate an MSI message or an MSI-X message based on device ID, physical function ID, and virtual function ID (if present) in the fetched interrupt identification data 340.

As shown in block 404, based on a type of MSI message identified, the MSI message control logic 302 accesses at least a second level LUT, such as data/address LUTs 364a-364d, that includes associated MSI data 600 and address 602 information corresponding to the selected incoming interrupt request. As shown in block 406, if the interrupt message type is MSI, then the MSI message generator logic 306 generates MSI message 308 using the address 602 and data 600 information in data/address lookup tables 364a and 364c and well as other data from other LUTS depending on the interrupt ID data 340 to generate an MSI message. Similarly, if the interrupt message type is MSI-X, then the MSI-X message generator 310 generates an MSI-X message 312 for the target device using the address 1000 and data 1002 from the MSI-X data/address lookup table 364*b* if there is only a PF number and LUT 364*d* if there is also a VF. Data from other requisite lookup tables is also pulled as needed.

Stated another way, in some implementations, each interrupt signal is tagged with a unique index number which is used to search a interrupt description LUT 320 to get this interrupt information, also referred to as interrupt identification data 340, such as source client device type 341, device number 343, PF number 345, vf_hit/vf_number 347, vector_index 349, vector_offset 353, etc. from the interrupt description LUT 320. In some implementations the unique index number is an address in the interrupt description LUT 320 that is stored in memory, such as static random access memory (SRAM) or other suitable type of addressable memory. In some implementations, each LUT is stored as a standalone SRAM table and in other implementations all of the LUTS are stored in consecutive address spaces in SRAM.

After searching out interrupt information from the interrupt description LUT 320, this information is used to search out corresponding MSI/MSI-X data in a plurality of LUTs. In order to facilitate the searching operation, both MSI and MSI-X data are split into a plurality of multiple LUTs.

After the interrupt identification data 340 is obtained from the interrupt description LUT 320, a first LUT, referred to as a control LUT 362 is accessed, in the plurality of linked LUTs and is used to decide a type of MSI message that is to be generated. such as whether a MSI message or MSI-X message is to be sent out by the interrupt controller. The control LUT 362 is searched by device number, PF number and VF number (if SRIOV is supported). The supported device number and PF number can be parameterized (in one example, the device number is 4 and each device supports a maximum of 8 PFs), and in some implementations, this control LUT also stores VF related MSI and MSI-X control information.

The second LUT is an MSI data/address LUT 364*a* which is searched by device number, PF number and VF number (if SRIOV is supported). The MSI data/address LUT 364*a* is generated to include message and address data for multiple different client devices in a same lookup table. The other linked lookup tables also include Table I information for multiple different client devices in a same lookup table. The third and fourth LUTs 366*a* and 368*a* are used for MSI MASK bits 700 and pending bits 800. The motivation to split MSI table information into multiple LUTs is to facilitate data searching. The fifth level LUT 370*a* (FIG. 10), for MSI-X message generation, is configured by the interface logic (e.g., firmware) and used to store each function's starting entry offset 900 in a sixth LUT, namely the MSI-X data and address LUT 364*b*. It is searched by device number. PF number and VF number (if SRIOV is supported). For example, each entry offset 900 corresponds to the "Entry 0" address for a given device/function in the MSI-X data/address LUT 364*b* since each function's supported interrupt vector number may be different and since all devices interrupt entries are stored into one LUT, an entry offset is used to search out a corresponding interrupt entry which includes message data and address. As such, the sixth LUT 364*b* and 364*d* stores each function's MSI-X data 1002 and address 1000. The information is obtained using the output from the fifth LUT and interrupt vector index to search the sixth LUT. The seventh LUT, such a third level LUT 366*b* and eighth LUT 368*b* are like that of corresponding MSI LUTs and store MSI-X MASK bits 1100 and MSI-X pending bits 1200. The ninth LUT in this example is a sixth level LUT 372 and is a steering tag LUT and stores steering tag data 1300 in case steering tags are stored in the MSI-X table. The MSI message control logic 302 generates the MSI-X message 312 using the data from the MSI-X LUTS. For example, to generate the MSI-X message 312, the interrupt controller uses linked LUT 370*a* to obtain the entry offset in LUT 364*b* to get the address 1000 and data 1002 for the message, and uses linked LUT 366*b* to get the MSI-X mask bit, linked LUT 368*b* to get the pending bits and linked LUT 372 to get the steering tag bits.

Among other technical advantages, making the interrupt message processing into a serialized style reduces die layout complexity, reduces power consumption and can result in cost savings. Prior parallel interrupt processing results in larger die area and more complex signaling. Implementing the MSI LUTs as addressable LUTs in memory, such as SRAM, saves die area compared with register flops. In systems where a large number of virtual functions (VF) with single root I/O virtualization (SRIOV) is supported, the MSI LUT interrupt mechanism is easy to scale and requires less power and die area to implement compared to legacy flop-based interrupt generations structures. In some implementations, a LUT based mechanism is used for MSI and MSIX interrupt processing instead of legacy flop-based mechanisms.

Although features and elements are described above in particular combinations, each feature or element can be used alone without the other features and elements or in various combinations with or without other features and elements. The apparatus described herein in some implementations use software or firmware stored on a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). The data stored on the non-transitory computer readable storage medium can then be used (i.e., executed) to create systems (e.g., boards, integrated circuits) that implement various embodiments of the invention.

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. An apparatus comprising:
   interface logic comprising:
   an arbiter, comprising a plurality of inputs configured to receive a plurality of incoming interrupt requests for a target device and comprising an output, the arbiter configured to serially arbitrate among the plurality of incoming interrupt requests and produce a selected incoming interrupt request via the output; and
   a controller configured to generate a message signaled interrupt (MSI) message for the target device based on the selected incoming interrupt request using a plurality of linked lookup tables (LUTs).

2. The apparatus of claim 1 comprising memory that stores the plurality of linked lookup tables and wherein the interface logic is configured to generate the plurality of linked lookup tables by storing message interrupt linking data in each of the plurality of linked lookup tables that is part of an entry in an interrupt description lookup table.

3. The apparatus of claim 1 wherein each of the plurality of incoming interrupt requests includes a unique index number and wherein the interface logic is further configured to:
   use the unique index number associated with the selected incoming interrupt request to fetch corresponding interrupt identification data for the selected incoming interrupt request from an interrupt description lookup table;
   use the fetched interrupt identification data to fetch MSI control information from a first level control lookup table, wherein the MSI control information indicates at least a type of MSI message to generate for the selected incoming interrupt request;
   based on a type of MSI message identified, access at least a second level LUT that comprises associated MSI data and address information corresponding to the selected incoming interrupt request; and
   generate the MSI message based on the associated MSI data and address information.

4. The apparatus of claim 2 wherein the interface logic wherein each of a plurality of entries in the interrupt description lookup table comprises interrupt identification data representing at least: a source client device type, a device identifier, a physical function identifier, a virtual function identifier, and a vector index.

5. The apparatus of claim 2 wherein generating the plurality of lookup tables in memory comprises remapping message signaled interrupt table information corresponding to each requesting client device such that a lookup table in the plurality of linked lookup tables comprises message and address data for multiple different client devices in a same lookup table.

6. The apparatus of claim 1 wherein the interface logic is further configured to remap MSI capability table information in response to an operating system capability request, to the plurality of linked lookup tables.

7. The apparatus of claim 2 wherein the message interrupt linking data that links the plurality of linked lookup tables is comprised of a device identifier and at least a physical function identifier, and wherein the interface logic is configured to generate the MSI message based on data fetched from the plurality of linked LUTs using the device identifier and the physical function identifier.

8. The apparatus of claim 4 wherein the interface logic further comprises a first in first out (FIFO) buffer for requesting client devices, wherein each FIFO buffer is configured to receive incoming interrupt requests from the requesting client devices and output an incoming interrupt request to the arbiter.

9. A computer processing system comprising:
   a host processor;
   a plurality of peripheral component requesting client devices;
   peripheral component interconnect interface logic, operatively coupled to the host processor and to the plurality of peripheral component requesting client devices, comprising;
   memory comprising a plurality of linked lookup tables comprising data for generating a message signaled interrupt (MSI) message; and
   logic, operatively coupled to the memory, and configured to:
   serially arbitrate among a plurality of incoming interrupt requests from the plurality of peripheral component requesting client devices for the host processor and produce a selected incoming interrupt request; and
   generate the message signaled interrupt (MSI) message for the host processor based on the selected incoming interrupt request using the plurality of linked lookup tables (LUTs).

10. The computer processing system of claim 9 wherein the memory comprises an interrupt description lookup table and wherein the logic is configured to generate the plurality of linked lookup tables by storing message interrupt linking data in each of the plurality of linked lookup tables that is part of an entry in the interrupt description lookup table.

11. The computer processing system of claim 9 wherein each of the plurality of incoming interrupt requests includes a unique index number and wherein the logic is further configured to:
   use the unique index number associated with the selected incoming interrupt request to fetch corresponding interrupt identification data for the selected incoming interrupt request from an interrupt description lookup table;
   use the fetched interrupt identification data to fetch MSI control information from a first level control lookup table, wherein the MSI control information indicates at least a type of MSI message to generate for the selected incoming interrupt request;
   based on a type of MSI message identified, access at least a second level LUT that comprises associated MSI data and address information corresponding to the selected incoming interrupt request; and
   generate the MSI message based on the associated MSI data and address information.

12. The computer processing system of claim 10 wherein the logic further comprises an arbiter that is configured to receive the plurality of incoming interrupt requests for the host processor from the plurality of peripheral component requesting client devices and wherein each of a plurality of entries in the interrupt description lookup table comprises data representing at least: a source client device type, a device identifier, a physical function identifier, a virtual function identifier, and a vector index.

13. The computer processing system of claim 10 generating the plurality of linked lookup tables in memory comprises remapping message signaled interrupt table information corresponding to each requesting client device such that a lookup table in the plurality of linked lookup tables comprises message and address data for multiple different client devices in a same lookup table.

14. The computer processing system of claim 9 wherein the peripheral component interconnect interface logic is further configured to remap MSI capability table information in response to an operating system capability request, to the plurality of linked lookup tables.

15. The computer processing system of claim 10 wherein the message interrupt linking data that links the plurality of linked lookup tables is comprised of a device identifier and at least a physical function identifier, and wherein the logic is configured to generate the MSI message based on data fetched from the plurality of linked LUTs using the device identifier and the physical function identifier.

16. A method for generating a message signaled interrupt (MSI) comprising:
serially arbitrating among a plurality of incoming interrupt requests and producing a selected incoming interrupt request; and
generating a message signaled interrupt (MSI) message for a target device based on the selected incoming interrupt request using a plurality of linked lookup tables (LUTs).

17. The method of claim 16 comprising:
generating the plurality of linked lookup tables by storing message interrupt linking data in each of the plurality of linked lookup tables that is part of an entry in an interrupt description lookup table; and
storing the plurality of linked lookup tables in memory.

18. The method of claim 16 wherein each of the plurality of incoming interrupt requests includes a unique index number and wherein the method includes:
using the unique index number associated with the selected incoming interrupt request to fetch corresponding interrupt identification data for the selected incoming interrupt request from an interrupt description lookup table;
using the fetched interrupt identification data to fetch MSI control information from a first level control lookup table, wherein the MSI control information indicates at least a type of MSI message to generate for the selected incoming interrupt request;
based on a type of MSI message identified, accessing at least a second level LUT that comprises associated MSI data and address information corresponding to the selected incoming interrupt request; and
generating the MSI message based on the associated MSI data and address information.

19. The method of claim 17 comprising using a unique index number associated with the selected incoming interrupt request as an address to fetch corresponding interrupt identification data for the selected incoming interrupt request from an interrupt description lookup table and wherein each of a plurality of entries in the interrupt description lookup table comprises interrupt identification data representing at least: a source client device type, a device identifier, a physical function identifier, a virtual function identifier and a vector index.

20. The method of claim 19 wherein the message interrupt linking data that links the plurality of linked lookup tables is comprised of the device identifier and at least the physical function identifier, and wherein the method includes generating the MSI message based on data fetched from the plurality of linked LUTs using the device identifier and the physical function identifier.

* * * * *